Aug. 14, 1951   J. W. HENDRY   2,564,203
PROCESSING CHAMBER SUPPORT FOR PLASTIC MACHINES
Filed Jan. 6, 1951
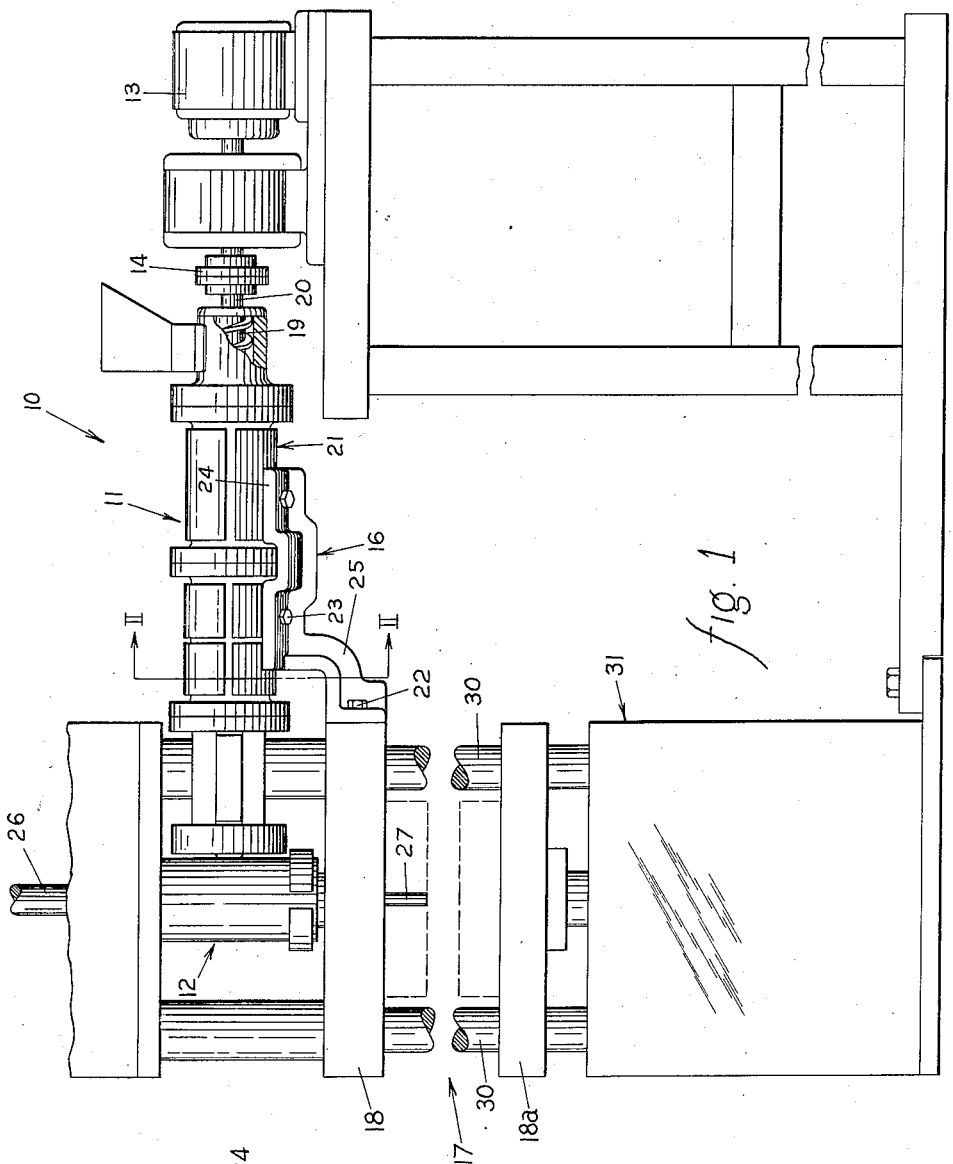
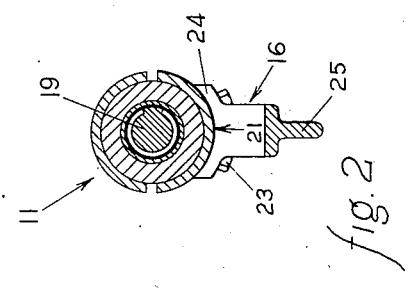
JAMES W. HENDRY
Inventor
By
Attorney Patented Aug. 14, 1951

2,564,203

UNITED STATES PATENT OFFICE 2,564,203

PROCESSING CHAMBER SUPPORT FOR PLASTIC MACHINES

James W. Hendry, Bay City, Mich.

Application January 6, 1951, Serial No. 204,795

2 Claims. (Cl. 18—30)

1

This application is a continuation-in-part of my application entitled "Plastic Working Machine," filed May 18, 1949, Serial No. 93,935.

This invention relates to an improvement in the construction of plastic molding machines and more specifically to improved means for supporting the horizontal processing chamber of a plastic molding machine of the type disclosed and described in my co-pending application, Serial No. 93,935.

In a molding machine, of the type disclosed in my co-pending application, Serial No. 93,935, the molding process, from the raw plastic to the finally molded product is carried out in a single machine. Essentially this machine consists of a horizontal processing chamber connected adjacent a ram chamber. The processing chamber is provided with a feeding screw for advancing the plastic into the ram chamber and the ram chamber is provided with a hydraulically actuated ram which is intermittently raised and lowered to force the charges of plastic into the mold.

The processing chamber is secured to the vertical ram chamber at one end by means of a conventional, threaded joint, to insure a secure union between the two chambers. As disclosed in my prior application, Serial No. 93,935, it is necessary to have this tight connecting relation between the two chambers in order to insure the closing off of the processing chamber by the ram during its downward pass.

When the ram is actuated downwardly against the plastic charge in the bottom of the ram chamber the force thereof reacts against the strain rods upon which the upper platen and ram cylinder are mounted. These rods stretch sufficiently under said force to permit movement of the entire ram chamber with respect to the base of the machine. This has been found to result in a bending force between the two chambers which over a period of time will tend to deform the tightly secured processing chamber and injure its otherwise tight end connection to the vertical ram chamber. This bending force is especially prevalent where large capacity molding machines are involved.

Therefore, a principal object of this invention is to provide means for supporting the processing feed chamber whereby a tight relationship may be maintained between the processing chamber and the vertical ram chamber and the bending force therebetween eliminated.

A further object of this invention is to provide a mounting for the processing chamber

2 whereby the connection between said processing chamber and the ram chamber will not be subjected to the bending resulting from the stretching of the strain rods as occurring in present constructions.

Other objects of this invention will become apparent to those familiar with this type of machine upon reading of the following description and drawings.

In the drawings:

Figure 1 is a side elevation view of a plastic molding machine with a fragmentary showing of the supporting structure and of the actuating means for the injection ram and the lower mold bed.

Figure 2 is a sectional view taken along line II—II of Figure 1.

The terms "upper" and "lower" and "rightward" and "leftward" shall refer to that portion of the machine and the parts thereof when in position as shown in Figure 2.

As shown in the drawings, Figures 1 and 2, the plastic molding machine 10 embodying my improvement, consists essentially of a horizontal processing chamber 11, secured at one end to a vertical ram chamber 12 and at the other end to a prime mover 13 through flexible coupling 14. The processing chamber is further supported at its center by the support arm 16 extending from and secured to the upper platen 18 of the mold supporting mechanism 17.

In describing the illustrated embodiment of my invention, as shown in the drawings, reference is made to the fact that many of the details of this machine are the same as, or similar to, the corresponding details in the machine shown in my application Serial No. 93,935. Therefore, the description of this machine may and will be limited to a general description sufficient to illustrate the improvements over the machine of said parent application without touching upon constructural details which have already been previously shown and described.

As shown in Figures 1 and 2, the processing chamber 11 has a feed screw 19 with a drive shaft 20 for rotating the feed screw and advancing the plastic toward the ram chamber 12. The drive shaft 20 is connected in operational relation to the prime mover 13 by means of any conventional flexible coupling 14.

The processing chamber 11 is further supported near its center along its outside bottom periphery 21 by means of support arm 16 which is secured to the upper platen 18 of the mold supporting mechanism 17 of the machine by bolts 22 and to the processing chamber 11 by means of bolts 23. Strain rods 30 support said upper platen 18 upon the base 31, as illustrated and described in detail in my co-pending application No. 93,935.

The support arm 16, Figure 2, is advantageously T shaped with the upper part 24 of the T, adjacent to the processing chamber 11, being shaped to fit snugly against and straddle the bottom periphery 21 of the processing chamber. The lower portion, or the stem, 25 of the T acts to reinforce the arm support 16. The bolts 23 extend through the upper portion of the T, as shown in Figure 2, securing the arm 16 to the horizontal processing chamber 11.

In operation, as the plastic charge is fed into the ram chamber 12 from the processing chamber 11, as described at length in my said copending application, the lower platen 18a is brought up adjacent and against the upper platen 17 and the ram 26 is hydraulically actuated downward to move the plastic charge into the mold.

When the ram developes pressure against the plastic mass for urging it downward into the mold through the nozzle 27, the upper platen tends to move upwardly slightly relative to the base 31. The horizontal processing chamber 11, which is connected to the ram chamber 12 and secured thereto by the support arm 16 is caused to move with the ram chamber. Thus, when the ram chamber moves upwardly or downwardly the leftward end of the processing chamber also moves similarly.

Since the rightward end of the processing chamber 11 is connected to the prime mover 13 through the flexible coupling 14, the rightward end of the processing chamber 11 may in this construction follow the motion of the leftward end without subjecting the drive shaft 20 to distortion or bending.

The processing chamber 11 is supported at three points namely at the leftward end by connection with the vertical ram chamber 12, at the center by support arm 16, and at the rightward end by the flexible coupling 14. Thus, by suspending the horizontal processing chamber between the prime mover and the vertical ram chamber, without any direct attachment to the frame support means, the processing chamber may move freely with the movement of the ram cylinder without injuring the connection between the two chambers, nor will the relationship between the drive shaft 20 and the prime mover 13 be interrupted.

By the use of my suspended processing feed chamber the communicating openings of the two chambers are kept centered; the tight connection between the two chambers is preserved; leakage of plastic from the feed chamber is avoided; and the life of both chambers is prolonged.

Although the above mentioned drawings and description apply to one preferred embodiment of my invention, it is not my intention, implied or otherwise, to eliminate other variations or modifications which do not depart from the scope of the invention unless specifically stated to the contrary in the hereinafter appended claims.

I claim:

1. In a plastic molding machine having a vertically disposed ram, or injection, cylinder, a horizontal processing cylinder connected to said ram cylinder intermediate the ends thereof and having a working and propelling screw within said processing cylinder with a drive shaft connected thereto and extending out from said processing cylinder at the end thereof opposite to that end connected to the ram cylinder, and a prime mover adjacent said shaft, the improvement in mounting means therefor comprising in combination: a base; first means mounting said ram cylinder onto said base; second means mounting said prime mover onto said base; third means mounting said processing cylinder onto said first means; and a flexible coupling connecting said prime mover to said shaft; whereby the ram cylinder and the processing cylinder may move toward and away from said base as a unit and without injury to the joint between said parts.

2. In a plastic molding machine having a vertically disposed ram, or injection, cylinder, an upper mold platen affixed to said ram cylinder, a horizontal processing cylinder connected to said ram cylinder intermediate the ends thereof and having a working and propelling screw within said processing cylinder with a drive shaft connected thereto and extending out from said processing cylinder at the end thereof opposite to that end connected to the ram cylinder, and a prime mover adjacent said shaft, the improvement in mounting means therefor comprising in combination: a base; a plurality of parallel rods upstanding from said base and means supporting said upper platen thereon; means mounting said prime mover onto said base; a bracket mounting said processing cylinder onto said upper platen; and a flexible coupling connecting said prime mover to said shaft; whereby the ram cylinder and the processing cylinder may move toward and away from said base as a unit and without injury to the joint between said parts.

JAMES W. HENDRY.

No references cited.